United States Patent [19]

Lenard et al.

[11] 4,065,589

[45] Dec. 27, 1977

[54] POLYMERIC COATING FOR PROTECTION OF GLASS SUBSTRATE

[75] Inventors: William Lenard, Temperance, Mich.; Lynn J. Taylor, Toledo, Ohio

[73] Assignee: Owens-Illinois, Inc., Toledo, Ohio

[21] Appl. No.: 585,111

[22] Filed: June 9, 1975

[51] Int. Cl.² ............................................. B65D 11/16
[52] U.S. Cl. .................................... 428/35; 215/12 R; 215/DIG. 6; 428/215; 428/430; 428/431; 428/435; 428/441; 428/442
[58] Field of Search ................. 428/35, 215, 430, 431, 428/435, 441, 442; 215/12 R, DIG. 6; 260/878 R

[56] References Cited

U.S. PATENT DOCUMENTS

| | | | |
|---|---|---|---|
| 3,523,145 | 8/1970 | Manaresi et al. | 260/878 R |
| 3,544,490 | 12/1970 | Alexander et al. | 260/878 R |
| 3,604,584 | 9/1971 | Shak | 215/12 R |
| 3,632,680 | 1/1972 | Hunt et al. | 260/878 R |
| 3,797,690 | 3/1974 | Taylor et al. | 220/1 R |
| 3,805,985 | 4/1974 | Hagiwara et al. | 260/878 R |
| 3,823,032 | 7/1974 | Ukai | 215/12 R |
| 3,825,141 | 7/1974 | Campagna | 215/12 R |
| 3,825,142 | 7/1974 | Campagna | 215/12 R |
| 3,859,117 | 1/1975 | Erchak et al. | 215/12 R |
| 3,886,234 | 5/1975 | Ishihara et al. | 260/878 R |
| 3,889,030 | 6/1975 | Arrandale et al. | 428/35 |
| 3,912,100 | 10/1975 | Graham et al. | 215/12 R |
| 3,919,440 | 11/1975 | Takahashi et al. | 428/35 |

*Primary Examiner*—William R. Dixon, Jr.
*Attorney, Agent, or Firm*—Donald K. Wedding

[57] ABSTRACT

In accordance with this invention, a basic three-component chemically convertible polymeric coating composition is applied to the surface of a glass substrate and subsequently converted to a crosslinked coating by the application of heat or another form of energy. The polymeric coating composition contains at least three essential ingredients:

1. a rubbery thermoplastic organic polymer;
2. an organic peroxide or hydroperoxide; and
3. a polymerizable ethylenically unsaturated monomer having a functionality of at least two.

3 Claims, 2 Drawing Figures

U.S. Patent  Dec. 27, 1977  4,065,589
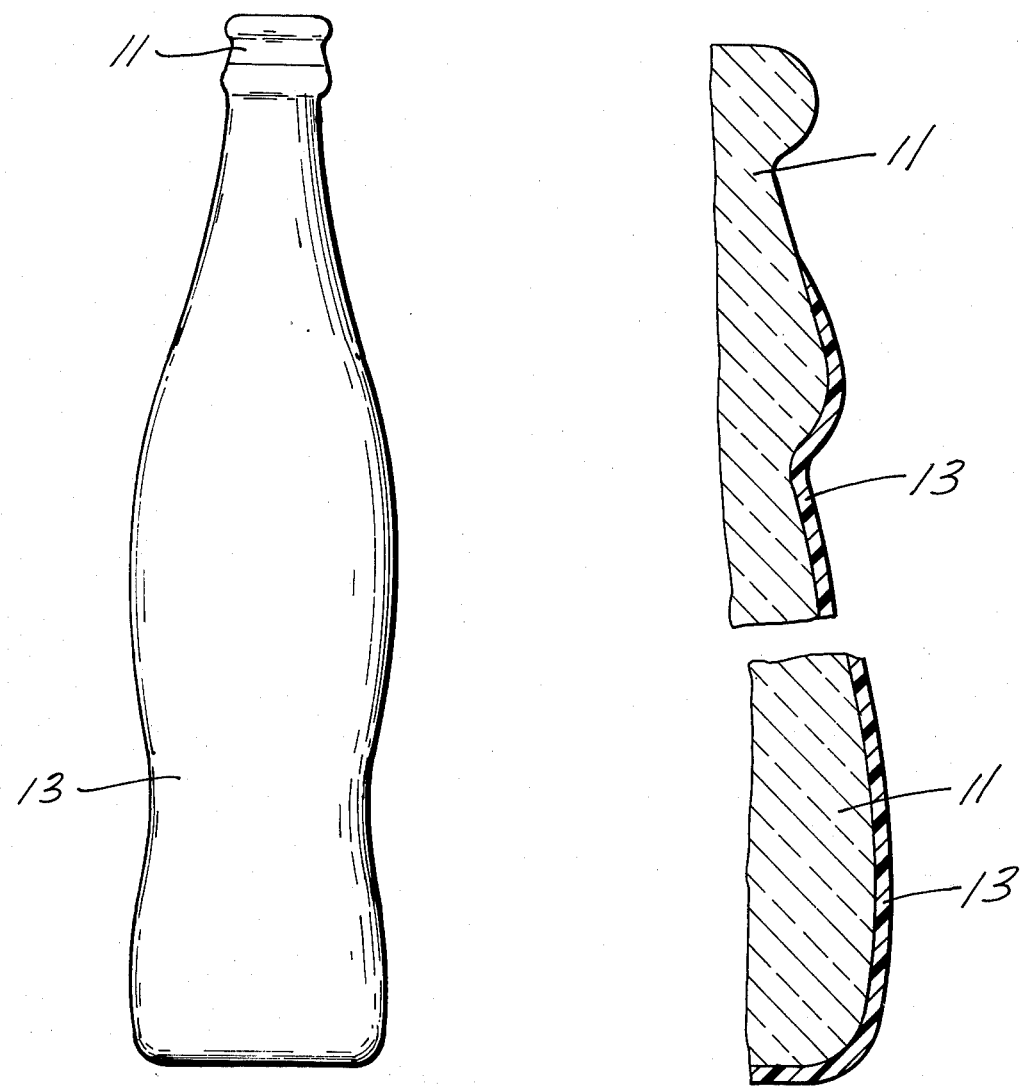

POLYMERIC COATING FOR PROTECTION OF GLASS SUBSTRATE

BACKGROUND OF THE INVENTION

It is well-known that glass in its pristine condition is a very strong material, but that scratches and abrasion on the glass surface will considerably decrease its strength. Consequently, glass articles, for example, containers such as jars, bottles, tumblers, and the like, have maximum strength immediately after formation; however, this strength diminishes when the glass article surface contacts other surfaces as may occur during the inspection, handling, packaging, shipping, and consumer use of the article.

To overcome this problem, there has been a great deal of research in the glass industry towards development of thin, tenaciously adhering, lubricious, damage-preventive coatings which preserve the glass strength and allow the glass article to be handled and used by the consumer.

In the glass container industry, such damage-preventive coatings have been primarily of two types. In one type, the container is coated with a thin organic coating at the "cold end" of the annealing lehr where the temperature is in the range of 200°-400° F. These coatings have been water soluble polyoxyethylene stearate as in U.S. Pat. No. 2,813,045; polyethylene as in U.S. Pat. No. 2,995,533; and U.S. Pat. No. 2,965,596; or other organic materials as in U.S. Pat. Nos. 3,445,275; 3,487,035; 3,357,853; and 3,296,174.

In the second type of coating, the glass container is first coated with metal oxides such as the oxides of tin, titanium, vanadium, or zirconium at the hot end of the annealing lehr where the temperature is in the range of 1000° to 1100° F. and then overcoated with a protective organic coating at the cold end of the lehr. Such dual coatings are illustrated in U.S. Pat. Nos. 3,323,889; 3,425,859; 3,598,632; 3,554,787; 3,498,825; 3,418,154; 3,420,693; 3,445,269; 3,407,085; 3,414,429; and 3,352,707. The above types of coatings are "production line" coatings because their application is accomplished as part of the forming and annealing sequence. The disclosures of these patents are incorporated herein by reference.

The success of some of these and other types of coatings, particularly those "cold end" coatings of polyethylene or polyoxyethylene stearate (with or without the "hot end" coating of $TiO_2$ or $SnO_2$) in preserving the strength of the glass containers during inspection, handling, filling, and use has permitted glass researchers to focus on the problems caused by mishandling and accidental misuse of glass containers by the consumer.

Glass containers are sometimes fractured by dropping or other accidental misuse. This problem is particularly acute when the glass container has pressurized contents such as in the case of beer or carbonated soft drinks.

In accordance with this invention, there is provided a polymeric coating for glass containers which is capable of retaining broken glass fragments upon fracture of the glass container so as to reduce the incidence of accidental injury.

Attention has been directed to this problem in the recent past. For instance, German patent disclosure 2,026,909, published Dec. 10, 1970, discloses coating a glass container wth a loosely or firmly adhering plastic material designed to form a "bag" which retains glass fragments when the container is broken. The film is formed by fusing powdered polyethylene to the glass bottle. German patent document 2,149,219, published May 25, 1972, discloses coating glass containers with a film coating of a hydrolyzed ethylene-vinyl acetate copolymer, U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Pat. No. 3,415,673 discloses glass containers which are made resistant to breakage by coating the exterior surface with a thin, highly adhesive layer of plastic consisting essentially of ethylene and acrylic copolymers. A primer is used to tenaciously adhere the copolymer to the surface of the glass article.

Studies of the effect of organic coatings on the fragmentation of glass substrates have demonstrated that soft, flexible, "rubbery" polymeric coatings are extremely effective in retaining fragments. However, such coatings are not ordinarily suitable for use on glass containers, owing to their poor abrasion and mar resistance, low lubricity, and surface tack, which preclude the handling of such coated containers on automatic filling lines. The present invention improves the physical properties and surface characteristics of such coating materials through chemical crosslinking.

DESCRIPTION OF THE INVENTION

Any suitable glass substrate is contemplated. However, in one particular embodiment of this invention as contemplated by the inventors, there is utilized a glass container. The following description of embodiments and specific practices of this invention will generally be discussed in terms of a glass container substrate.

In accordance with this invention, there is prepared a coated glass substrate, having fragment-retentive properties.

More particularly, in accordance with the practice of this invention, a chemically convertible polymeric coating composition is applied to the surface of a glass substrate and subsequently converted to a protective polymer film by the application of heat or other forms of energy. The chemically convertible coating composition contains at least three ingredients:

1. at least one rubbery thermoplastic organic polymer;
2. at least one peroxidic organic compound; and
3. at least one polymerizable ethylenically unsaturated monomer having a functionality of at least two.

The term "rubbery thermoplastic organic polymer" may be defined as an elastomeric organic polymer having an ultimate elongation of at least 100%, the elongation being determined by ASTM D-638, published in the 1975 Annual Book of ASTM Standard, Part 35, pages 192 et seq, as published by the American Society for Testing and Materials. At the time of the application to the glass substrate, the polymer is thermoplastic, i.e. it is not crosslinked, but it can subsequently be crosslinked by the combined action of the peroxidic organic compound and heat or another form of energy.

Typical examples of suitable rubbery thermoplastic organic polymers include ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers including both block and random copolymers, styrene-isoprene copolymers, acrylonitrile-butadiene copolymers, isobutylene-isoprene copolymers, polyurethanes thermoplastic polyesters, ethylene-propylene-diene terpolymers, styrene-ethylene-butylene block terpolymers, polypentenamers, and polyamides derived from "dimer acid."

The phrase "peroxidic organic compound," as used herein, may be defined as an organic compound which possesses at least one oxygen-oxygen bond. Typical peroxidic organic compounds include peroxides and hydroperoxides such as tert-butyl hydroperoxide, cumene hydroperoxide, diisopropylbenzene hydroperoxide, 2,5-dimethylhexane- 2,5-dihydroperoxide, p-menthane hydroperoxide; 1,1,3,3-tetramethylbutyl hydroperoxide, acetyl peroxide, benzoyl peroxide, p-chlorobenzoyl peroxide, 2,4-dichlorobenzoyl peroxide, ditoluoyl peroxide, decanoyl peroxide, lauroyl peroxide, isobutyryl peroxide, diisononanoyl peroxide, pelargonyl peroxide, tert-butyl peroxyacetate, tert-butyl peroxymaleic acid, tert-butyl peroxy-isobutyrate, tert-butyl peroxypivalate, tert-butyl peroxybenzoate, tert-butyl peroxycrotonate, tert-butyl-Peroxy-(2-ethylhexanoate), 2,5-dimethyl-2,5-bis-(2-ethylhexanoylperoxy) hexane, 2,6-dimethyl-2,5-bis-(benzoylperoxy) hexane, 2,5-dimethyl-2,5-bis-(tert-butyl-peroxy) hexane, 2,5-dimethyl-2,5-bis-(tert-butylperoxy)-hexyne-3, di-tert-butyl diperoxyphthalate, 1,1,3,3-tetramethylbutylperoxy-2-ethyl-hexanoate, di-tert-butyl peroxide, di-tert-amyl peroxide, tert-amyl-tert-butyl peroxide, 1,1-di-tert-butylperoxy-3,3,5-trimethyl cyclohexane, bis-(tert-butylperoxy)-diisopropylbenzene, n-butyl-4,4-bis-(tert-butylperoxy)valerate, dicumyl peroxide, acetyl acetone peroxide, methyl ethyl ketone peroxide, cyclo hexanone peroxide, tert-butylperoxy isopropyl carbonate, 2,2-bis-(tert-butylperoxy) butane, di-(2-ethylhexyl) peroxydicarbonate, and bis-(4-tert-butylcyclohexyl) peroxydicarbonate.

Polymerizable ethylenically unsaturated monomers having a functionality of two or greater are also present in the coating composition. Typical examples of such polyfunctional monomers include allyl acrylate, allyl methacrylate, Bisphenol A dimethacrylate, diallyl phthalate, diallyl adipate, divinyl benzene, diethylene glycol diacrylate, diethylene glycol dimethacrylate, ethylene diacrylate, ethylene dimethacrylate, hexamethylene diacrylate, methallyl acrylate, pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate, and trimethylolpropane trimethacrylate.

The term "functionality," as used herein, is defined as the number of carbon-carbon double bonds (i.e. ethylenically unsaturated groups) present per molecule of the polymerizable monomer. Thus a monomer having a functionality of two would contain two carbon-carbon double bonds per molecule of monomer. The term polyfunctional is applied to monomers having a functionality of two or more.

Application of the coating composition to the glass substrate may be accomplished by a variety of methods known in the coating art, including spraying, dipping, roller coating, flow-coating, or silk-screening of liquid compositions containing solvents or dispersants in addition to the essential polymer and peroxidic organic compound. Also there may be used hot-melt coating, extrusion coating, powder coating, and the application of a pre-formed film or sleeve of the cross-linked polymeric composition.

Following application of the coating to the substrate, the coating is dried, if necessary, to remove any volatile materials such as solvents or dispersants, and simultaneously or subsequently crosslinked by the application of heat or another form of energy, such as infrared, visible, or ultraviolet radiation; ionizing radiation; radiofrequency or microwave radiation; or ultrasonic irradiation.

In addition to the essential polymer, peroxidic material, and polyfunctional monomer, the protective coating composition may contain one or more additional ingredients which may modify its appearance or properties, but do not detract from its essential tendency to retain glass fragments. Such additional ingredients include colorants, plasticizers, surfactants, reinforcing agents, foaming agents, antioxidants, ultraviolet stabilizers, antistatic agents, lubricants, flame retardants, adhesion promoters, and processing aids. Incorporation of silane adhesion promoters is particularly advantageous in those applications requiring alkali resistance, i.e. coated returnable glass containers.

In one preferred embodiment of this invention, a solution containing the rubbery thermoplastic polymer, the peroxidic organic compound, the polyfunctional monomer, and a suitable volatile solvent is applied to the surface of a glass container. The coating is dried, then crosslinked by heating to the decomposition temperature of the peroxidic compound.

In a further preferred embodiment of the present invention, a peroxidic compound and a polyfunctional monomer are incorporated into an aqueous emulsion ("latex") of a rubbery thermoplastic polymer. The resulting emulsion is applied to the surface of a glass substrate, dried at an ambient or elevated temperature, and then crosslinked by heating to the decomposition temperature of the peroxidic compound.

In a further specific embodiment of the present invention, a blowing agent such as an azo compound is incorporated into a liquid coating composition which also contains the rubbery thermoplastic polymer, the peroxidic compound, the polyfunctional monomer, and a suitable solvent or dispersant. The resulting composition is applied to a glass surface, dried, and heated to produce a glass substrate bearing a cellular crosslinked protective coating.

The coatings of the present invention may be used in laminar combinations with other coatings, such as thin, lubricious coatings of oxidized polyethylene; primers, particularly those containing silane coupling agents, which increase adhesion to glass even in the presence of water and alkali; and abrasion-resistant exterior coatings.

The crosslinked polymeric coatings of this invention are typically of sufficient thickness (0.002 inch or greater) to resist shattering of a pressurized container, e.g. one filled with a carbonated soft drink or beer. However, thinner protective coatings of the same type may be used, particularly for applications in which the container does not contain internal pressure.

It is contemplated that the basic three-component cross-linkable polymeric compositions of the present invention will ordinarily contain about 70 to 98.99 percent by weight of the rubbery thermoplastic organic polymer, about .01 to 10 percent by weight of the peroxidic organic material, and about 1 to 29.99 percent by weight of the polyfunctional monomer.

The proportions of such additional ingredients as may be present in the three component systems are not considered in calculating these percentages.

DESCRIPTION OF THE DRAWING

The following figures represent one of the best embodiments contemplated by the inventor in the practice of his invention.

FIG. 1 is a side view of a glass container 11 coated on its external surface with the protective polymeric coating 13 of this invention.

FIG. 2 is an enlarged, fragmental cross-sectional view of the glass container 11 shown in FIG. 1 illustrating a more precise structure of the protective coating 13.

The container 11 may be of any desired geometric shape. Although the polymeric coating 13 is illustrated as gradually terminating at the top portion of the container, it could be extended over the entire neck of the container. Likewise, further organic or inorganic coatings can be applied before or after the application of the protective polymeric coating 13.

We claim:

1. As an article of manufacture, a glass container at least partially coated with a single protective polymeric film having a thickness of at least 0.002 inch and sufficient to resist glass shattering of the container under pressure, the crosslinked film having been formed in situ on the glass container from a composition consisting of about 70% to about 98.99% by weight of at least one rubbery thermoplastic organic polymer, about 0.01% to about 10% by weight of at least one peroxidic organic compound, and about 1% to about 29.99% by weight of at least one polyfunctional monomer; said polymer being an elastomeric organic polymer having an ultimate elongation of at least 100%, being crosslinkable and being selected from the group consisting of ethylene-vinyl acetate copolymers, hydrolyzed ethylene-vinyl acetate copolymers, ethylene-ethyl acrylate copolymers, ethylene-acrylic acid copolymers and their salts, ethylene-propylene copolymers, styrene-butadiene copolymers including both block and random copolymers, styrene-isoprene copolymers, acrylonitrile-butadiene copolymers, isobutylene-isoprene copolymers, polyurethane thermoplastic polyesters, ethylene-propylene-diene terpolymers, styrene-ethylene-butylene block terpolymers, polypentenamers, and polyamides derived from a dimer acid; said peroxidic organic compound possessing at least one oxygen-oxygen bond; and said polyfunctional monomer being a polymerizable ethylenically unsaturated monomer having a functionality of at least two.

2. The article of claim 1 wherein said polymerizable ethylenically unsaturated monomer is selected from the group consisting of allyl acrylate, allyl methacrylate, Bisphenol A dimethacrylate, diallyl phthalate, diallyl adipate, divinyl benzene, diethylene glycol diacrylate, diethylene glycol dimethacrylate, ethylene diacrylate, ethylene dimethacrylate, hexamethylene diacrylate, methallyl acrylate pentaerythritol tetraacrylate, pentaerthyritol triacrylate, neopentyl glycol dimethacrylate, tetraethylene glycol dimethacrylate, diallyl allylphosphonate, triallyl cyanurate, triallyl phosphate, and trimethylolpropane trimethacrylate.

3. The article of claim 2 wherein said peroxidic organic compound is selected from the group consisting of tert-butyl hydroperoxide, cumene hydroperoxide, diisopropylbenzene hydroperoxide, 2,5-dimethylhexane- 2,5-dihydroperoxide, p-menthane hydroperoxide; 1,1,3,3-tetramethylbutyl hydroperoxide, acetyl peroxide, benzoyl peroxide, p-chlorobenzoyl peroxide, 2,4-dichlorobenzoyl peroxide, ditoluoyl peroxide, decanoyl peroxide, lauroyl peroxide, isobutyryl peroxide, diisononanoyl peroxide, pelargonyl peroxide, tert-butyl peroxyacetate, tert-butyl peroxymaleic acid, tert-butyl peroxy-isobutyrate, tert-butyl peroxypivalate, tert-butyl peroxybenzoate, tert-butyl peroxycrotonate, tert-butyl-peroxy-(2-ethylhexanoate), 2,5-dimethyl-2,5-bis-(2-ethylhexanoylperoxy) hexane, 2-5-dimethyl-2,5-bis-(benzoylperoxy)hexane, 2,5-dimethyl-2,5-bis-(tert-butyl-peroxy) hexane, 2,5-dimethyl-2,5-bis-(tert-butyl-peroxy)-hexyne-3, di-tert-butyl diperoxyphthalate, 1,1,3,3-tetramethylbutylperoxy-2-ethyl-hexanoate, di-tert-butyl peroxide, di-tert-amyl peroxide, tert-amyl-tert-butyl peroxide, 1,1-di-tert-butylperoxy-3,3,5-trimethyl cyclohexane, bis-(tert-butylperoxy)-diisopropyl-benzene, n-butyl-4,4-bis-(tert-butylperoxy)valerate, dicumyl peroxide, acetyl acetone peroxide, methyl ethyl ketone peroxide, cyclo hexanone peroxide, tert-butylperoxy isopropyl carbonate, 2,2-bis-(tert-butyl-peroxy) butane, di-(2-ethylhexyl)peroxydicarbonate, and bis-(4-tert-butylcyclohexyl) peroxydicarbonate.

* * * * *

UNITED STATES PATENT AND TRADEMARK OFFICE
CERTIFICATE OF CORRECTION

PATENT NO. : 4,065,589
DATED : Dec. 27, 1977
INVENTOR(S) : William Lenard and Lynn J. Taylor It is certified that error appears in the above–identified patent and that said Letters Patent are hereby corrected as shown below:

Col. 5, line 25 to read "least partially coated with a single protective crosslinked polymeric"

Signed and Sealed this

Sixth Day of July 1982

[SEAL]

Attest:

GERALD J. MOSSINGHOFF

*Attesting Officer*  *Commissioner of Patents and Trademarks*

Disclaimer

4,065,589.—*William Lenard*, Temperance, Mich. and *Lynn J. Taylor*, Toledo, Ohio. POLYMERIC COATING FOR PROTECTION OF GLASS SUBSTRATE. Patent dated Dec. 27, 1977. Disclaimer filed July 19, 1982, by the assignee, *Owens—Illinois, Inc.*

Hereby enters this disclaimer to all claims of said patent.

[*Official Gazette November 23, 1982.*]